United States Patent [19]

Cotter

[11] 4,096,827
[45] Jun. 27, 1978

[54] SELF-CLEANING CAT WASTE DISPOSAL DEVICE

[76] Inventor: James A. Cotter, 9195 Keegan Trail, Missoula, Mont. 59801

[21] Appl. No.: 758,552

[22] Filed: Jan. 11, 1977

[51] Int. Cl.² .............................................. A01K 29/00
[52] U.S. Cl. ........................................................ 119/1
[58] Field of Search ............................................ 119/1

[56] References Cited

U.S. PATENT DOCUMENTS

| | | | |
|---|---|---|---|
| 2,671,427 | 3/1954 | Fell | 119/1 |
| 3,233,588 | 2/1966 | Thomas | 119/1 |
| 3,482,546 | 12/1969 | Anderson | 119/1 |
| 3,796,188 | 3/1974 | Bradstreet | 119/1 |
| 3,908,597 | 9/1975 | Taylor | 119/1 |

*Primary Examiner*—Hugh R. Chamblee
*Attorney, Agent, or Firm*—Clarence A. O'Brien; Harvey B. Jacobson

[57] ABSTRACT

A self-cleaning cat waste disposal device having a portable suitcase style container structure with two substantially identical compartments pivotally connected together along one edge thereof and latchable together by a three-way handle along an opposite edge thereof. A pivotally mounted screen unit is included between the container compartments and latchable to one or the other by the handle structure. The handle structure functions in a three-way manner and permits the screen unit and the two container units to be all three firmly latched together, or the screen unit to be positively latched to one container unit or the other. One embodiment of the device provides for a single removable trap unit associated with the pivotal connection for both the container compartments and with a guide funnel arrangement for catching waste from one of the compartments or the other when the device is being operated. Another embodiment provides for a removable trap unit associated with each of the respective container compartments. Appropriate detent retention features for the trap units are also provided, as well as guide channel structure between the edges of the screen unit and the inside lip of the container units for retaining kitty litter as used with this device therewithin.

12 Claims, 11 Drawing Figures

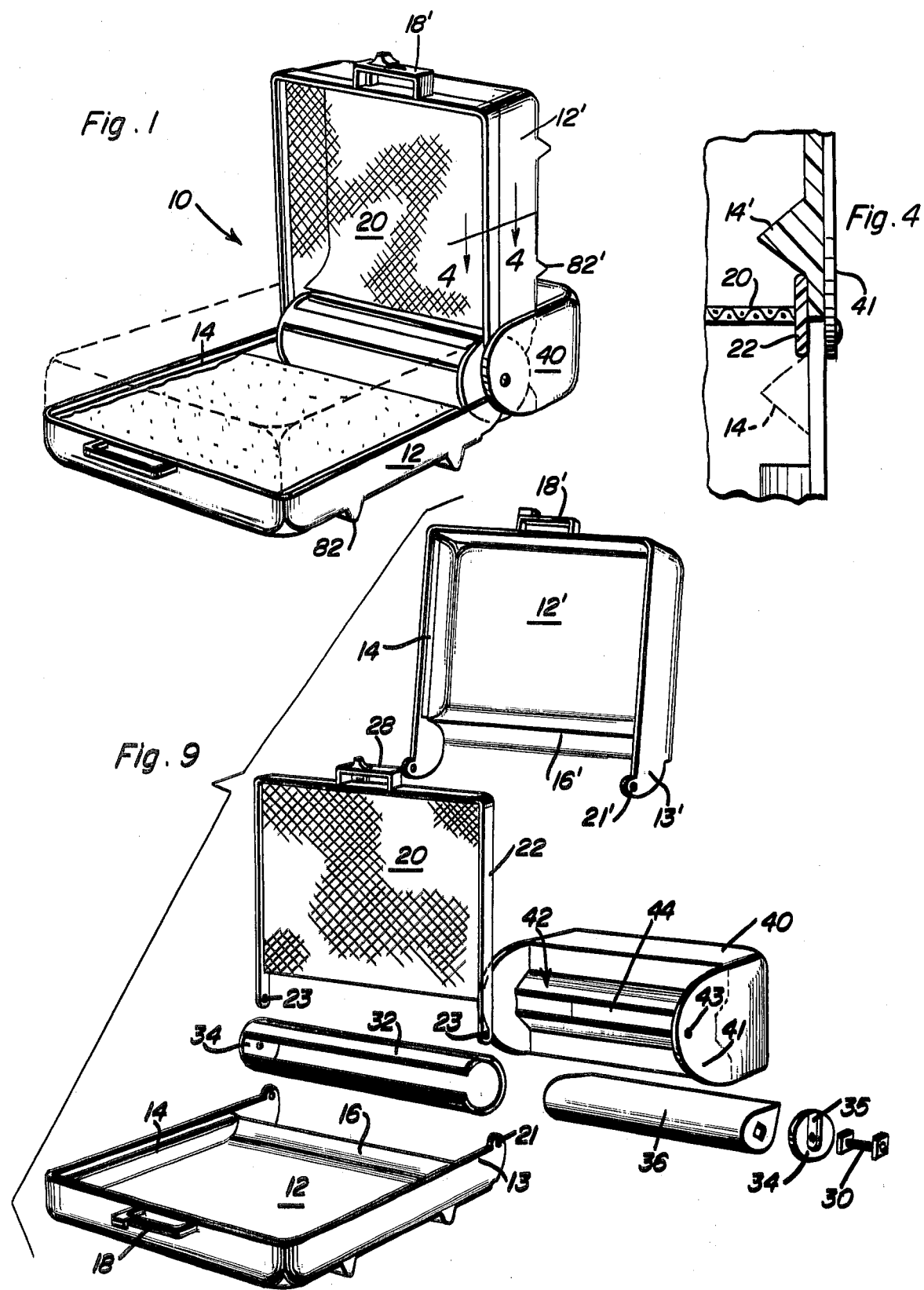

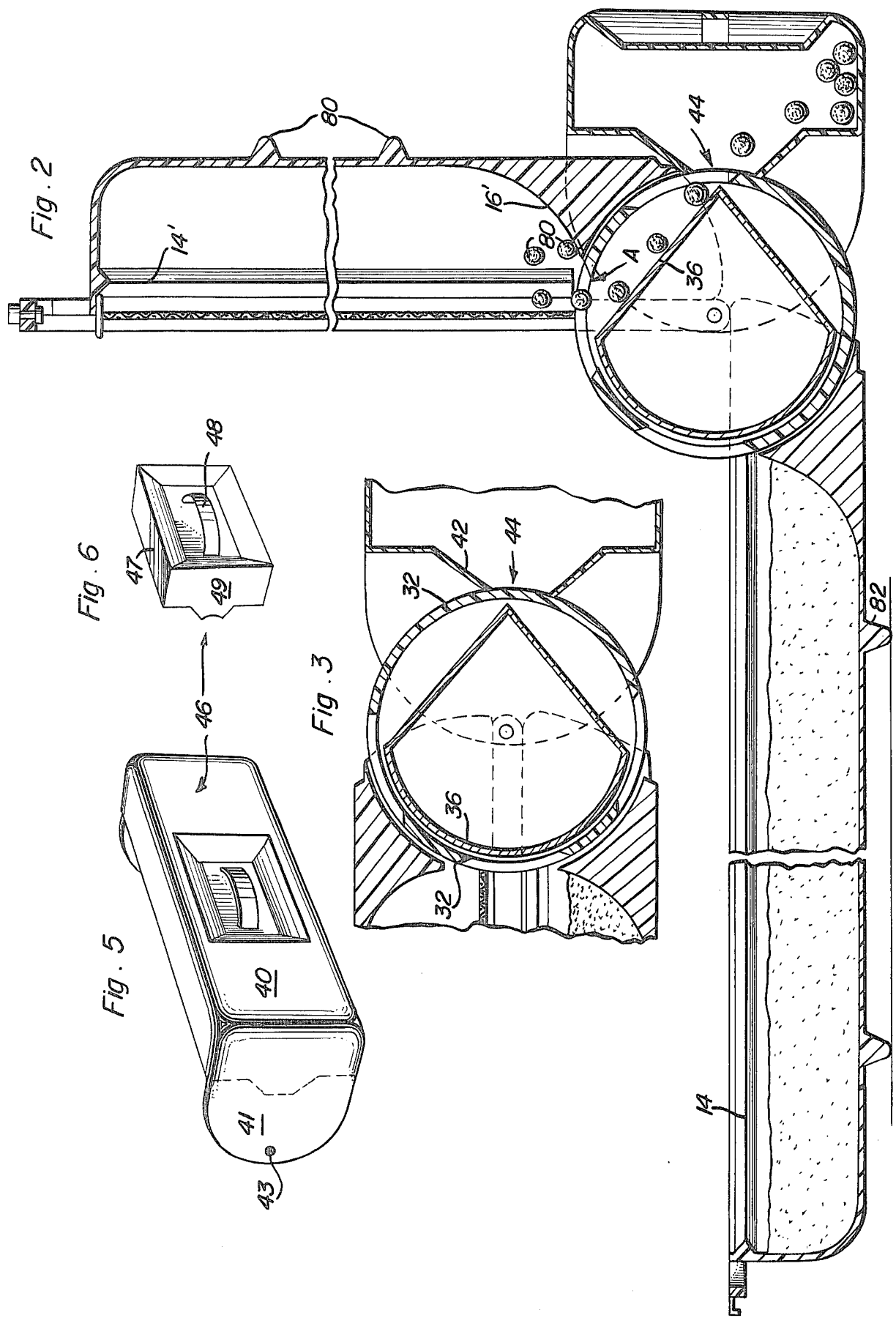

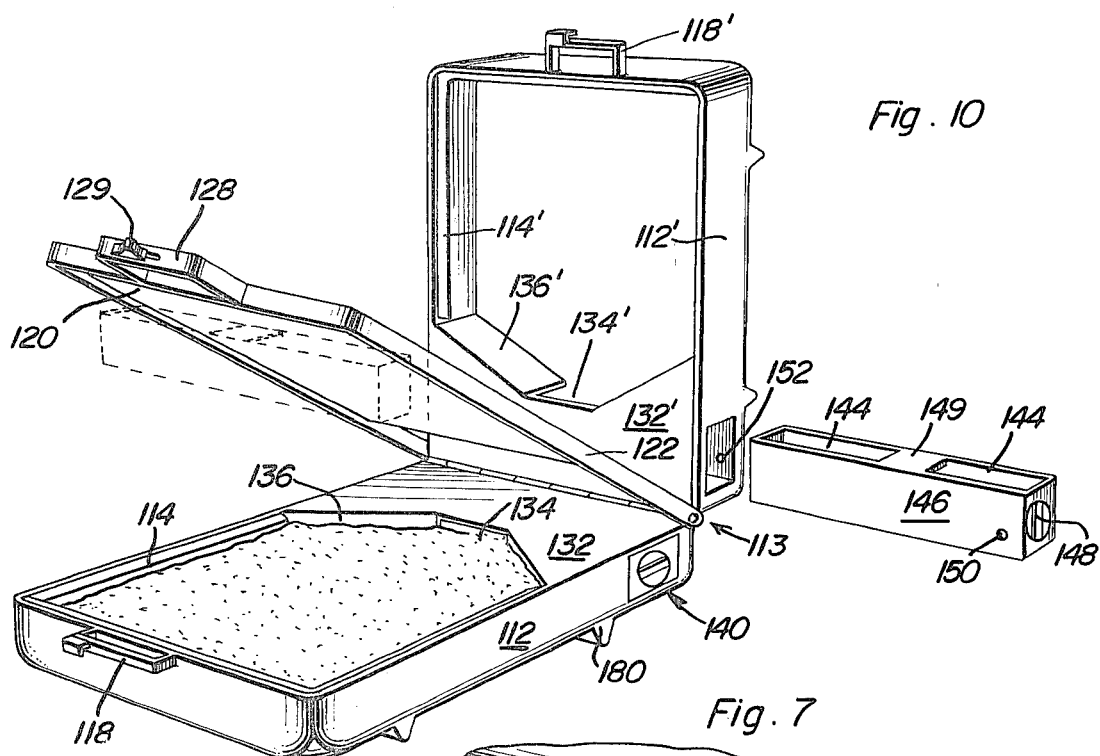
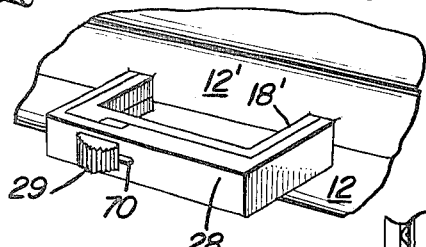
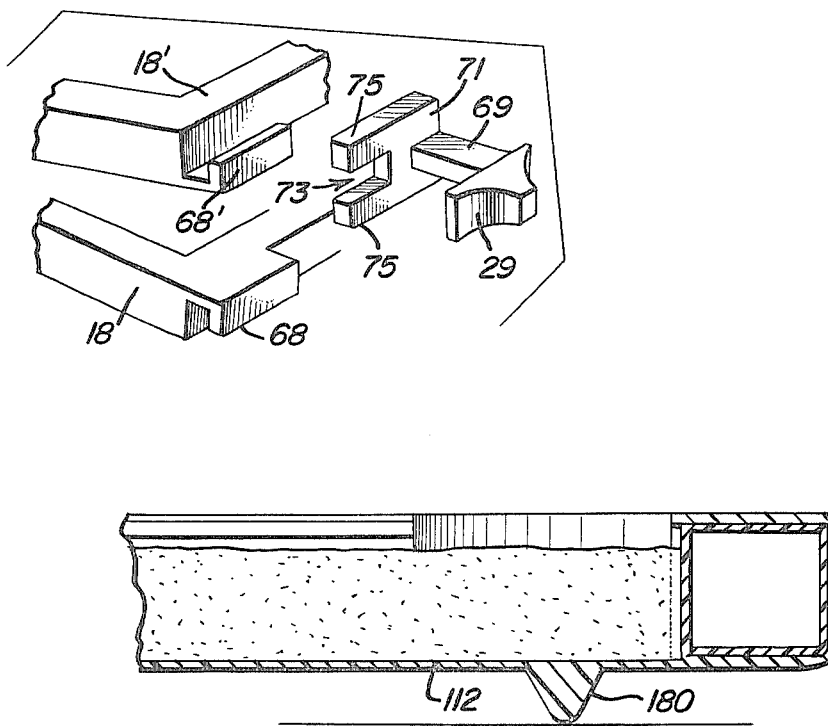

SELF-CLEANING CAT WASTE DISPOSAL DEVICE

BACKGROUND OF THE INVENTION

1. Field of the Invention

This invention relates generally to devices for receiving and containing animal waste excrement and specifically to a portable unit which has a self-cleaning function thereto.

2. Description of the Prior Art

A common problem with known type devices for disposing of animal excrement is that relatively great physical contact is required to change, screen, or clean out the animal excrement receivng container. Some known type devices have self-straining screen partitions associated with the litter containing boxes, but a great deal of physical contact is normally required in order to operate this structure.

Another problem with known type devices is that they are not portable but are designed for semi-permanent mounting in a house or other area. They are often times large, bulky and relatively difficult to operate and clean.

Other known type devices have removable trap structure of various forms, but usually fail to have semi-automatic loading and catch features for the traps as associated with the animal waste catching structure.

Known prior art patents which may be pertinent to this invention are as follows U.S. Pat. Nos.:

| | | |
|---|---|---|
| 2,671,427 | M. E. Fell | Mar. 9, 1954 |
| 3,482,546 | E. J. Anderson | Dec. 9, 1969 |
| 3,735,735 | George Norolan | May 29, 1973 |
| 3,796,188 | Samuel R. Bradstreet | Mar. 12, 1974 |
| 3,831,557 | James N. Elesh | Aug. 27, 1974 |
| 3,908,597 | Chester E. Taylor | Sept. 30, 1975 |
| 3,937,182 | Minako Kamimura | Feb. 10, 1976 |

None of these known prior art devices offers the new and unique features of the invention disclosed herein.

SUMMARY OF THE INVENTION

An object of the present invention is to provide a self-cleaning cat waste disposal device which may be easily moved from place to place, is extremely simple and efficient in operation, and completely eliminates the necessity for the user of the device to come in contact with any of the cat waste at any time during use thereof.

Another object of the present invention is to provide a portable device having substantially identical container compartments for kitty litter, together with a screen structure for filtering animal waste from the kitty litter as normally associated with the device.

A further object of this invention is to provide a portable suitcase style animal waste catching and holding structure which is basically self-cleaning during operation thereof. Trap structure is associated with the device for the catching of animal waste material during operation of the device and system for easy disposal of said waste, either at the moment or at a later time.

A still further object of this invention is to provide two substantially identical litter container members pivotally mounted together along one edge thereof with a three-way latch mechanism along another edge thereof and with a pivotally mounted screen unit between said container members. The three-way latch will positively retain the screen member with one container unit or the other, or may be used to lock all three units positively together when the device is being used in portable fashion. The latch mechanism also is used as a handle for the device. Removable trap structure together with guide funnel structure, and detent retention means for the traps also are included. The lip structure on the inside of the container members is designed to cooperate with the screen unit to prevent spillage or loss of the litter used with the device.

The device of this invention has a number of new and unique features. It is designed for easy and convenient portability and for the purpose of permitting an animal lover, and especially a cat lover, to provide a covenient and ready place for the animal, especially cats, to "do their buisness".

The basic structure essentially consists of two substantially identical units which are connected together along one edge of each unit in suitcase style. Another edge of each of the two substantially identical units is provided with a portion of a latch handle mechanism which together with a screen unit pivotally mounted within and between the two units, and suitably provided with a third portion of the handle latch mechanism can be locked in closed position. This three-way handle mechanism is one of the important features of the invention. While it permits the entire structure to be locked in closed position, it also permits the pivotally mounted screen unit to be latched together with either one container unit or the other container unit. This is important to the overall method of operation of the device.

A tapered projecting flange or lip is provided along the inside edges of the container openings for keeping litter as used with the structure within the container units, and also to complement and mate with the pivotally mounted screen structure for forming a litter-tight connection therewith.

One embodiment of the invention has a single trap structure associated therewith while another embodiment employs two trap structures, with an individual trap structure being mounted in each of the respective container units.

Basically, the self-cleaning cat litter device of this invention consists of two container compartments, each functioning in alternate fashion as a bottom unit when the device is in use, and when the device is closed and turned over, a self-cleaning function takes place for separating the cat excrement from the litter material. At the pivot end of each container compartment is a trap system consisting in one embodiment of a slotted cylinder, an inner cone cylinder, a trap box and trap box cover. Between the two container lids is a screen assembly which strains the cat litter. The device functions in the following manner, the unit is placed on the floor and the compartment with the screen fastened thereto by the unique three-way handle mechanism is lifted up and moved to the vertical. The other container compartment is then resting horizontally on the floor with the kitty litter therewithin; the cat box is now ready for use. After the cat or other animal has used the litter material and it needs cleaning, the vertically positioned compartment with the screen attached thereto is closed, the three-way handle mechanism locked to secure all three units and then the entire device flipped over. Note the device may be flipped over in any direction. Upon being flipped over, the former bottom container compartment now is on top, and this container compartment with screen attached thereto is then opened. The litter meanwhile has passed through the screen and the only material on the screen and within the upper container compartment is the undesirable waste material. That is, the feces is strained out of the litter material when the closed device is flipped over, and when the new top container compartment with screen attached thereto is raised to allow the cat access to the new bottom container compartment, the opening movement automatically turns the slotted trap cylinder into open alignment with the upper container compartment so that the cat feces, now trapped in the top compartment, falls down onto the cylinder which funnels the waste into the trap box. The trap box can then be removed and the feces dumped into the toilet or otherwise disposed of in a sanitary manner.

The inner core besides serving to funnel the feces, is also a sealer to prevent litter material from going into the trap area. The design is such that the litter material is prevented from going into the trap area, or into any of the moving parts, regardless of whether the container compartments are open or closed.

The entire device may be locked shut through the unique three-way handle mechanism, picked up by the handle, and carried. The litter material will fall into either one side or the other when the device is placed on the floor and opened again. The device is designed so that the consumer and user thereof never sees the animal waste and especially cat feces, and care and attention to detail during designing and construction makes is almost impossible for the user to have an accident and spill either the litter or feces.

The motion of flipping the device over screens the litter and the motion of opening the unit again which has to be done so that the cat can gain access thereto, provides the energy that deposits the feces into a trap where it can be disposed of at the user's convenience.

The trap box cover serves to give a flat, long surface that the device can be placed upon in an upright manner in case of auto travel, train travel, plane travel, or just plain storage. It also serves to hold the inner cone cylinder, to which it is secured, stationary. The inner cone does not turn, but the slotted cylinder does, activated by the screen which raises automatically with the compartment to which it is latched. The mechanical uniqueness of this device allows the unit to be operated from either side, so that it does not have to turned over 360°, but just 180°.

There are a number of very important benefits and advantages of this device. The user never sees the waste material, the feces is placed into a trap for easy disposal, the litter is cleaned and reused many times for a saving in cost as well as better cat health. The unit can be taken on trips and may also be provided with an accessory line offering additional functions and uses. The entire device can be taken to a dumping site when it is necessary to dispose of the litter material. When the container compartments are closed and secured with the three-way handle mechanism, the unit can be turned in any direction and positively no spillage will occur. The device is preferably made substantially of plastic material or the like and therefore can be easily cleaned and hosed out to keep everything sanitary. In tests, only four seconds were required to completely clean the device. Also, cat urine in the litter sticks on the compartments, as it sometimes does in the bottom of present known cat boxes, and quickly dries in the top compartment when open and the loosened litter falling into the trap where the urine contaminated litter is present can be tossed out with the feces.

Basically, the entire system employs very few steps. To clean the cat box of this device, (1) close the lid; (2) flip over the entire device (any direction is OK); (3) open the lid; and (4) remove trap and dump. For the next cleaning simply again repeat the above process.

The second embodiment of this invention is quite similar to the first one, but each container compartment is provided with a separate individual trap box and individual built-in funnel structure for directing the waste material that has been screened out into the trap box structure to collect the waste material. Built-in detents retain the respective trap boxes in their closed positions until such time as the cleaning and disposal operation takes place.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of one embodiment of this invention in open position.

FIG. 2 is a side elevational view, partly in cross section, of the embodiment of FIG. 1 in open position.

FIG. 3 is a fragmentary portion of the FIG. 2 view of the component funnel parts of this embodiment in closed position.

FIG. 4 is a detailed view, partly in cross section, taken generally along line 4—4 of FIG. 1.

FIG. 5 is a perspective view of the trap structure for the embodiment of FIG. 1. FIG. 6 is a perspective view of the removable trap box per se.

FIG. 7 is a closed perspective view of the three-way latch and handle mechanism.

FIG. 8 is an exploded perspective view of the working parts of the three-way latch and handle mechanism.

FIG. 9 is an exploded perspective view of the device of FIG. 1.

FIG. 10 is a perspective view of another embodiment of this invention.

FIG. 11 is a fragmentary side elevational view, partly in cross section, of the embodiment of FIG. 10.

DESCRIPTION OF THE PREFERRED EMBODIMENT

Referring to FIG. 1 of the drawings, reference numeral 10 indicates in general the self-cleaning cat waste disposal device of this invention. A pair of complementary container compartments 12 and 12' have extending hinge portions 13 and 13' so that the compartments may be connected pivotally together in suitcase fashion. Each compartment is also provided with inwardly projecting ledges or flanges 14 and a triangular-shaped funnel structure 16. On the edge of the respective compartments opposite the funnel structure and pivotal hinge connection are handle portions 18 and 18'. A pivotal screen structure 20 is supported by a U-shaped frame 22 having apertures 23 at the open ends thereof. These apertures are so the screen structure 20 may be pivotally mounted by the same pivot pins 30 as go through the apertures 21 and 21' of the respective compartments for permitting their pivotal action. Another handle portion 28 is mounted on the connected portion of the inverted U frame 22 for engagement with the handle portions 18 and 18' of the compartments which will be described in detail below.

Looking at FIG. 9, the remaining components of the first embodiment may be seen. These are a slotted tube member 32, end caps 34 therefor, a cone member 36 which is basically of triangular shape in cross section, and a trap cover 40. The trap cover 40 has a built up central portion 42 providing a small central aperture 44 therewithin. FIG. 9 shows the inside structure of the trap cover, while FIG. 5 shows the outside thereof. Removably mounted from the outside of the trap cover 40 is a trap 46. This trap 46 has a recessed handle 48 and sides 47 and 49 which are designed to mate with the interior side of structure 42 of the trap cover (see FIGS. 2 and 3). This mating is such as to form a relatively tight fit so that animal waste material will be properly confined and guided into the trap. Extending projections 41 with apertures 43 therein provide the connection for the trap cover 40 to the pivot bolts 30. As can best be seen in FIG. 9, the end members 34 for the slotted tubular member 32 have elongated slots 35 provided therein. These slots 35 engage with the aperture ends of the screen frame structure 22.

The unique three-way handle mechanism of this invention may be best seen in the details of FIGS. 7 and 8. The handle portion 28 mounted on the central pivotable screen member 20 and associated frame 22 is provided with a novel latch structure. This structure has a knob 29 extending outside of the handle body 28 and through a slot 70 therein is mounted a bar member 69 with a locking member 71 attached thereto by means not shown. This locking member 71 is provided with a recess 73 so as to provide two projecting fingers 75. When the two compartments are closed together with the screen structure therebetween, the respective handle portions 18 and 18' telescope within the screen handle portion 28 in a fully closed manner as best seen in FIG. 7. The slide knob 29 then may be moved to the locking position, which is toward the left in the views of FIGS. 7 and 8, which will move fingers 75 into the recesses provided by the projecting members 68 and 68' on the respective compartment handle portions 18 and 18', best seen in FIG. 8. Thus, as can be readily visualized, when the overall structure is closed like a suitcase into a completely closed structure, as indicated in dotted lines in FIG. 1, the three-way handle of this invention may be locked to prevent inadvertent or accidental opening of the device. Just as easily, the handle may be used to lock the center screen member with one compartment or the other as the device is put into use, and/or used to empty waste material into the trap box.

Looking at FIGS. 2 and 3, the operation of the slotted tubular member 32 together with the funnel cone member 36 and the trap cover and associated trap box will now be described. As seen in FIG. 3 with the compartments closed, the tubular member 32 is positioned so that the opening 44 to the trap box is effectively closed. Also, even though the overall device may be stood up on end, that is placed on the trap cover 40 in suitcase fashion, the arrangement of the tubular structure and the funnel cone element 36 is such that nothing can leave the respective compartments or the trap box. Thus, kitty litter contained in one compartment or the other will be positively retained therewithin, and any waste in the trap box likewise will be retained therewithin.

Now looking at FIG. 2, which shows in cross section the open position like that of FIG. 1. Assuming that the compartment indicated by reference numeral 12' has been recently in the horizontal position and open for use by cats and other animals, when the compartment 12 was closed upon compartment 12' with the screen 20 therebetween and the closed device turned over, all of the kitty litter contained within compartment 12' falls through the screen leaving the cat waste still within compartment 12' and upon screen 20. Then, when compartment 12' together with the screen 20 are opened together as seen in FIGS. 1 and 2, the slots in tubular member 32 will be rotated to provide an opening A which together with the funnel surface 16' feeds the particles 80 of waste material to the funnel cone 36 and from there into opening 44 to the trap box for retention in same. With the compartment 12' and screen 20 in the vertical position of FIGS. 1 and 2, the other compartment 12 with the kitty litter contained therein will be open and in the horizontal position ready for use by cats when needed. Legs 82, 82' may be provided for the respective compartments.

FIG. 4 shows in enlarged detail the inwardly projecting rim structure and how the respective rim structure 14, 14' of compartments 12 and 12' meet with and form a seal with the screen frame 22. Preferably, the comparments, described are made of plastic material which offers enough resiliency and flexibliity for rims 14, 14' to form a relatively effective seal without any additional gasket members. However, if the situation warrants, screen frame structure 22 may be provided with additional gasket sealing material along the edges thereof. Another desirable feature of the inwardly projecting rims 14 and 14' is the discovery in actual use that if the cat or other animal scratches in the kitty litter which tends to throw such litter against the compartment sides, the rims 14, 14' will deflect such thrown material back into the compartment and prevent any loss thereof.

The components of this overall device preferably may be formed of plastic, either by extrusion, or by stamping or die forming. As the compartments are formed, projecting ribs 82 may be suitably formed therein for providing leg structure for the compartment which is resting on a horizontal surface.

Now looking at FIGS. 10 and 11, a modified embodiment of this device will be described. In this embodiment, the separate trap cover as well as the tubular member and cone funnel structure have been eliminated. The structure basically consists of two similar compartments 112 and 112' pivotally mounted at 113 by any conventional three-element hinge structure for the two compartments as well as the screen frame 122. Inwardly extending rim flanges 114 and 114' meet with the screen frame structure 122 to effectively seal the device as in the embodiment above. Similarly, handle structure 118, 118' and 128 with slide lock knob 129 of the same arrangement as in the first embodiment also is provided. The basic difference between this embodiment and the previous one is in the fact that the inside pivotal end of each compartment is provided with funnel-shaped structure 136, 136' together with lids 132, 132' and openings 134, 134'. The shape of the sides 136 and 136' when in the upright vertical position of the top compartment as attached to the screen frame will cause waste material to be channeled to and through the appropriate opening 134 or 134'. From said opening, the waste material can enter and be caught within trap box 146. An opening is provided at each side of the compartments 112, 112' for reception of a trap box therewithin. The trap box extends from one side of the compartment to the other, and each end of the trap box is provided with a recessed handle 148. A detent recess 150 cooperates with a resilient projection 152 on each side of the trap channel within the respective compartments to frictionally retain the trap in the normally closed position. In such normally closed position, partition 149 of the trap will block any flow of waste material through the openings 134, 134'. However, the trap box 146 need merely be pushed inwardly a slight distance, or pulled outwardly a similar distance, in order for one of the openings 144 to be in alignment with an opening 134, 134' of the funnel structure.

FIG. 11 shows a cross section with the trap box for the upper compartment partially pushed inwardly so an aperture 144 is in alignment with 134'. As can be seen, the waste material 70' will be funneled into the trap box in an easy, clean and sanitary manner, for immediate disposal, or even storage temporarily within the trap box for later disposal.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An animal waste collection and disposal device which contains a litter material into which animal waste matter is deposited, the device comprising:
    a pair of opposed housing members, each housing member having wall portions defining a litter-receiving chamber which is open over at least portions of one major planar face of said housing member;
    means for joining the housing members together for angular movement relative to each other, the open portions of the litter-receiving chambers facing each other on movement of said housing members together to form a substantially closed housing;
    a screen carried by the housing and adapted to be displaced with and relative to each of the housing members, the screen surmounting the open portion of each litter-receiving chamber when displaced into adjacent relation to each one of said housing members; and,
    waste receiving means carried by the housing for receiving waste matter contained within either of the litter-receiving chambers, whereby waste matter deposited in litter in one of the litter-receiving chambers in one housing member is trapped against the facing side of the screen on closure of the housing members together and inversion of the housing, the litter in said one chamber passing through the screen into the other chamber in the other housing member, the waste matter being displaced from the screen into a receptive proximity to the waste receiving means on angular displacement of the screen and said one housing member into a substantially tilted or vertical orientation.

2. The device of claim 1 wherein the joining means further mount the screen for angular movement relative to the housing members.

3. The device of claim 1 and further comprising;
    a flange disposed about and bordering the periphery of the open portion of each of the litter-receiving chambers in the housing members, the flange bordering each chamber extending beyond the mouth of each said chamber; and,
    a mating flange carried on each side of the screen, the mating flanges being congruent with the oppositely facing flanges on the respective housing members and fitting flushly thereagainst on disposition of the screen into a contiguous adjacent relation to said respective housing members, the said flushly fitting flanges sealing the peripheries of the chambers to prevent loss of litter or waste matter from the chambers about the peripheries thereof.

4. The device of claim 1 and further comprising means carried by the housing for alternately latching the screen to either one of the housing members.

5. The device of claim 1 and further comprising a handle member connected to the housing and adapted to be grasped for ready portability of the device.

6. The device of claim 5 wherein the handle member comprises separate handle portions connected one each to the housing members and to the screen, the handle portions being disposed into mutually contiguous relation on closure of the housing members together.

7. The device of claim 1 wherein each housing member is provided with a recess formed in one end thereof, the wall portions of the litter-receiving chamber in each housing member having an opening therein, the opening communicating the interior of the chamber with the interior of the recess, the waste receiving means comprising a trap box disposable within each of the recesses, each trap box having at least one aperture formed therein, the aperture being alignable with the opening in said wall portions to receive waste matter into the trap box therethrough.

8. The device of claim 7 wherein portions of the wall portions adjacent the openings slope toward the openings to facilitate disposition of the waste matter in proximity to the openings.

9. The device of claim 7 and further comprising a wall member disposed on the trap box adjacent said aperture, the wall member being alignable with the opening in said wall portions to prevent passage of litter into the trap box when litter is present in the chamber.

10. The device of claim 1 and further comprising guide channel means carried by the housing for directing waste matter into the waste receiving means.

11. The device of claim 7 and further comprising means for releasably retaining each trap box within the respective recess in which said trap box is contained when in the closed configuration.

12. An animal waste disposal device, comprising:
    means for holding litter material in a manner which permits easy portability thereof and yet permits easy set up for availability for use by an animal, the holding means including two substantially identical compartments hinged along similar edges of the respective compartments;
    means for cleaning the litter material automatically whenever the holding means is arranged for use of the litter material by an animal, the cleaning means including a screen member pivotally mounted between the two compartments for free movement between or with either one of the compartments;
    means for receiving waste accumulated by the cleaning means until said waste can be disposed of; and,
    a three-way latch structure associated with each of the compartments and the screen between said compartments for positively latching the compartments and the screen together or for latching the screen to either of the compartments.

* * * * *